United States Patent
Nishimura

(10) Patent No.: US 9,438,870 B2
(45) Date of Patent: Sep. 6, 2016

(54) DISPLAY SYSTEM, IMAGE DISPLAY DEVICE, AND METHOD OF CONTROLLING DISPLAY SYSTEM

(71) Applicant: SEIKO EPSON CORPORATION, Tokyo (JP)

(72) Inventor: Naoya Nishimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 36 days.

(21) Appl. No.: 14/479,663

(22) Filed: Sep. 8, 2014

(65) Prior Publication Data

US 2015/0077642 A1    Mar. 19, 2015

(30) Foreign Application Priority Data

Sep. 19, 2013   (JP) ................................. 2013-193900

(51) Int. Cl.
*H04N 9/31* (2006.01)
*G03B 21/10* (2006.01)

(52) U.S. Cl.
CPC ............ *H04N 9/3147* (2013.01); *G03B 21/10* (2013.01)

(58) Field of Classification Search
CPC ............ H04N 9/3147; H04N 9/3141; H04N 9/3173; H04N 9/3185; H04N 9/317; G03B 21/10; G03B 21/13; G03B 21/14
USPC ............................................. 353/30, 31, 94
See application file for complete search history.

(56) References Cited

U.S. PATENT DOCUMENTS

| | | | |
|---|---|---|---|
| 6,866,388 B2 * | 3/2005 | Yang .................... | H04N 9/3141 348/E5.143 |
| 8,313,199 B2 | 11/2012 | Hirata et al. | |
| 2006/0181685 A1 * | 8/2006 | Hasegawa ............. | G03B 37/04 353/69 |
| 2008/0212038 A1 * | 9/2008 | Hirata .................... | G02B 17/08 353/70 |
| 2010/0053164 A1 * | 3/2010 | Imai ...................... | G06F 3/011 345/427 |
| 2010/0182234 A1 * | 7/2010 | Takahashi ............. | G03B 21/14 345/157 |
| 2014/0315489 A1 * | 10/2014 | Lee ...................... | G06F 3/1454 455/41.2 |

FOREIGN PATENT DOCUMENTS

JP    A-2009-288803    12/2009

* cited by examiner

*Primary Examiner* — William C Dowling
*Assistant Examiner* — Ryan Howard
(74) *Attorney, Agent, or Firm* — Oliff PLC

(57) ABSTRACT

A display system having a projector and a projection plate and adapted to project an image from the projector toward the projection plate to thereby display the image includes a proximity detection section adapted to detect a proximity of another display system, which has a projector and a projection plate, and is adapted to project an image from the projector toward the projection plate to thereby display the image, and a control section adapted to determine a projection image, enlarge the projection image determined, and display the projection image enlarged so as to straddle the projection plate and the projection plate of the another display system in a case in which the proximity detection section detects the proximity of the another display system.

11 Claims, 9 Drawing Sheets

DISPLAY SYSTEM, IMAGE DISPLAY DEVICE, AND METHOD OF CONTROLLING DISPLAY SYSTEM

The entire disclosure of Japanese Patent Application No. 2013-193900, filed Sep. 19, 2013 is expressly incorporated by reference herein.

BACKGROUND

1. Technical Field

The present invention relates to a display system for displaying an image, an image display device, and a method of controlling a display system.

2. Related Art

In recent years, as described in JP-A-2009-288803, there has been widely used the configuration in which a plurality of display systems each integrally provided with a projector and a screen has been arranged on, for example, a floor in a store to display an image to thereby guide or advertise an event in the store.

In such a display system, there are adopted the projectors each adopting an ultra short focus projection optical system to be capable of projecting a large-sized image with a reduced space even including the screen in addition to providing a good projection image even when performing projection from directly below the screen, and the projectors project the content in cooperation with each other to exert an effect of gathering attention of a passerby to thereby attract customers.

However, the setting for making the plurality of projectors perform display in cooperation with each other is complicated, and it is necessary to reorder the plurality of display system and change the setting of the display system so as to perform display in cooperation with each other each time the content to be displayed is changed, which requires a lot of trouble and cost.

SUMMARY

An advantage of some aspects of the invention is to provide a display system, which can easily be set to perform display in cooperation with other display systems.

The invention can be implemented as the following forms or application examples.

APPLICATION EXAMPLE 1

A display system according to this application example is a display system having a projection device and a projection target member, and adapted to project an image from the projection device toward the projection target member to thereby display the image including a proximity detection section adapted to detect a proximity of another display system, which has a projection device and a projection target member, and is adapted to project an image from the projection device toward the projection target member to thereby display the image, and a control section adapted to determine a projection image, enlarge the projection image determined, and display the projection image enlarged so as to straddle the projection target member and the projection target member of the another display system in a case in which the proximity detection section detects the proximity of the another display system.

According to such a configuration, by making a plurality of display systems approach to each other, the projection image is determined, the projection image thus determined is enlarged, and is then displayed so as to straddle the projection target members of the plurality of display systems. Therefore, it is possible to easily make a plurality of display systems cooperate with each other to display the enlarged image so as to straddle the plurality of projection target members.

APPLICATION EXAMPLE 2

In the display system according to the application example described above, it is preferable that the control section determines either of the image projected by the projection device and the image projected by the projection device of the another display system as the projection image in the case in which the proximity detection section detects the proximity of the another display system.

According to such a configuration, the image projected by either of the display systems can be determined as the projection image.

APPLICATION EXAMPLE 3

In the display system according to the application example described above, it is preferable that there is further included a position detection section adapted to detect a positional relationship with the another display system in a proximity state, and the control section generates a plurality of divided images used to project the projection image toward the projection target member and the projection target member of the another display system in a divided manner based on the positional relationship detected by the position detection section.

According to such a configuration, since the position detection section detects the positional relationship with the another display system, the trouble of inputting the positional relationship between the plurality of display systems can be saved.

APPLICATION EXAMPLE 4

In the display system according to the application example described above, it is preferable that there is further included a communication section adapted to transmit the divided image generated by the control section to the another display system via wireless communication.

According to such a configuration, it is possible to wirelessly transmit the divided images generated by the display system to the another display system.

APPLICATION EXAMPLE 5

In the display system according to the application example described above, it is preferable that the control section executes one of a process in a master mode of generating the divided images from the projection image, making the projection device project one of the divided images generated, and transmitting the other of the divided images from the communication section to the another display system, and a process in a slave mode of receiving the divided image transmitted from the another display system, and making the projection device project the divided image received.

According to such a configuration, since the one display system can execute both of the process in the master mode and the process in the slave mode, the cooperation of the plurality of display systems can flexibly be constructed.

APPLICATION EXAMPLE 6

In the display system according to the application example described above, it is preferable that the control section makes the projection target member and the projection target member of the another display system start division display of the projection image in a case in which the projection target member and the projection target member of the another display system have contact with each other, and makes the division display be terminated in a case in which the projection target member and the projection target member of the another display system once having contact with each other are separated from each other.

According to such a configuration, by making the projection target members of the plurality of display systems have contact with each other or be separated from each other, it is possible to instruct the start and the stop of the division display of the projection image.

APPLICATION EXAMPLE 7

In the display system according to the application example described above, it is preferable that the control section expands a projection range in the projection target member in a case in which the proximity detection section detects the proximity of the another display system.

According to such a configuration, in the case of detecting the proximity of the another display system, by expanding the projection range in the projection target member, the improvement in visibility of the projection image can be achieved.

APPLICATION EXAMPLE 8

A display system according to this application example is a display system having a projection device and a projection target member, and adapted to project an image from the projection device toward the projection target member to thereby display the image including a proximity detection section adapted to detect a proximity of another display system, which has a projection device and a projection target member, and is adapted to project an image from the projection device toward the projection target member to thereby display the image, a selection section adapted to select one of an enlarged display mode of determining a projection image, enlarging the projection image thus determined, and displaying the projection image enlarged so as to straddle the projection target member and the projection target member of the another display system, and a copy display mode of displaying the image displayed on either one of the projection target member and the projection target member of the another display system on the other of the projection target member and the projection target member of the another display system in a case in which the proximity detection section detects the proximity of the another display system, and a control section adapted to control displaying in accordance with the mode selected by the selection section.

According to such a configuration, by making the plurality of display systems approach to each other, either of the enlarged display mode of determining the projection image, enlarging the projection image thus determined, and then displaying the projection image thus enlarged so as to straddle the projection target members of the plurality of display systems, and the copy display mode of displaying the image displayed by either one of the display systems on the projection target member of the other of the display systems is selected, and it is possible to enlarge or copy the image in accordance with the mode thus selected to thereby easily display the image.

APPLICATION EXAMPLE 9

In the display system according to the application example described above, it is possible that the selection section selects the enlarged display mode in a case in which a contact time between the projection target member and the projection target member of the another display system exceeds a predetermined time, and selects the copy display mode in a case in which the contact time between the projection target member and the projection target member of the another display system fails to exceed the predetermined time.

APPLICATION EXAMPLE 10

An image display device according to this application example is an image display device having a display unit adapted to display an image, including a proximity detection section adapted to detect a proximity of another image display device having a display unit adapted to display an image, and a control section adapted to determine a display image, enlarge the display image determined, and display the display image enlarged so as to straddle the display unit and the display unit of the another image display device in a case in which the proximity detection section detects the proximity of the another image display device.

According to such a configuration, by making a plurality of image display devices approach to each other, the projection image is determined, the projection image thus determined is enlarged, and is then displayed so as to straddle the display units of the plurality of image display devices. Therefore, it is possible to easily make a plurality of image display devices cooperate with each other to display the enlarged image so as to straddle the plurality of display units.

APPLICATION EXAMPLE 11

A method of controlling a display system according to this application example is a method of controlling a display system having a projection device and a projection target member, and adapted to project an image from the projection device toward the projection target member to thereby display the image, including: detecting a proximity of another display system, which has a projection device and a projection target member, and is adapted to project an image from the projection device toward the projection target member to thereby display the image, and determining a projection image, enlarging the projection image determined, and displaying the projection image enlarged so as to straddle the projection target member and the projection target member of the another display system in a case in which the proximity of the another display system is detected in the detecting of proximity.

According to such a method, by making a plurality of display systems approach to each other, the projection image is determined, the projection image thus determined is enlarged, and is then displayed so as to straddle the projection target members of the plurality of display systems. Therefore, it is possible to easily make a plurality of display systems cooperate with each other to display the enlarged image so as to straddle the plurality of projection target members.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
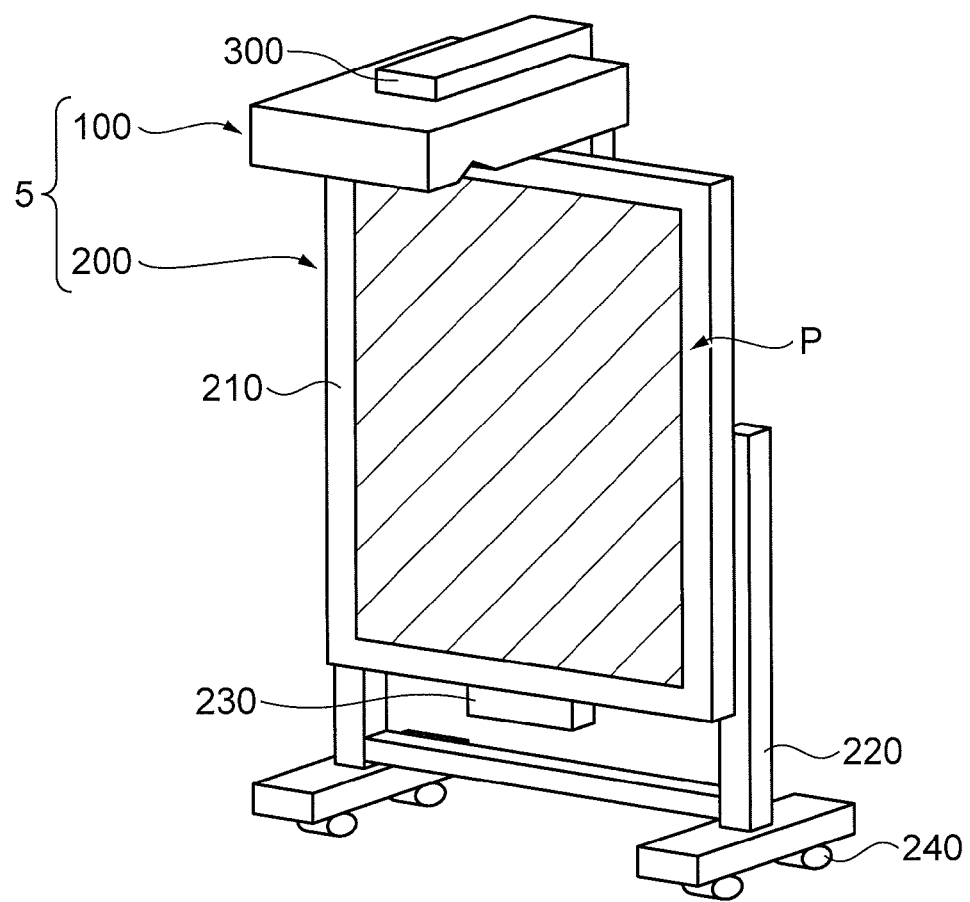
FIG. 1 is an external view of a display system according to a first embodiment of the invention.

Some embodiments of the invention will hereinafter be explained with reference to the accompanying drawings.
First Embodiment FIG. 1 is an external view of a display system 5. The display system 5 has a configuration including a projector 100 as a projection device and a white board 200 integrated with each other via a supporting member 300 as a holding mechanism. The supporting member 300 is attached to an upper part of the white board 200, and the support member 300 holds the projector 100 so as to suspend the projector 100.

The projector 100 is provided with a function of projecting the light beam to be projected while making the light beam wide-angle using a reflecting mirror, and projects a projection image (a display image) P on one surface of a projection plate 210 of the white board 200 as a projection target member. It should be noted that in the first embodiment, although there is assumed the configuration in which the projector 100 performs the projection from above the projection plate 210, the invention is not limited to this configuration. For example, there can also be assumed a configuration in which the projector 100 is fixed to a lower part of the projection plate 210, and performs the projection from below. Further, by using a transmissive screen as the projection plate 210, there can also be assumed a configuration in which the projector 100 performs the projection from a back surface side.

Further, it is also possible to use the display system 5 as an image display device, and use the projector 100 and the projection plate 210 as a display device.

The projection plate 210 has a rectangular shape longer in a vertical direction than in a horizontal direction in a front view, and the projector 100 is configured so as to perform the projection with predetermined amounts of blank areas disposed in the vertical and horizontal directions from the projection plate 210.

Further, the white board 200 is supported by a leg section 220, and casters 240 are disposed on a bottom surface of the leg section 220. Therefore, it is possible for the user to move the display system 5 in arbitrary directions.

Further, an operation section 230 for operating the display system 5 is disposed on the bottom of the projection plate 210, and it is possible for the user to make a desired image be projected on the projection plate 210 in an enlarged or contracted manner by operating the operation section 230.

Further, by making a plurality of display systems 5 cooperate with each other, and arranging the respective projection plates 210 in a horizontal line, the plurality of projection plates 210 is made to form a single projection area, and thus, it is possible for the respective display systems 5 to project divisional images in the projection area thus formed to thereby display a single image (see FIGS. 6A through 6D).

Figure 2:
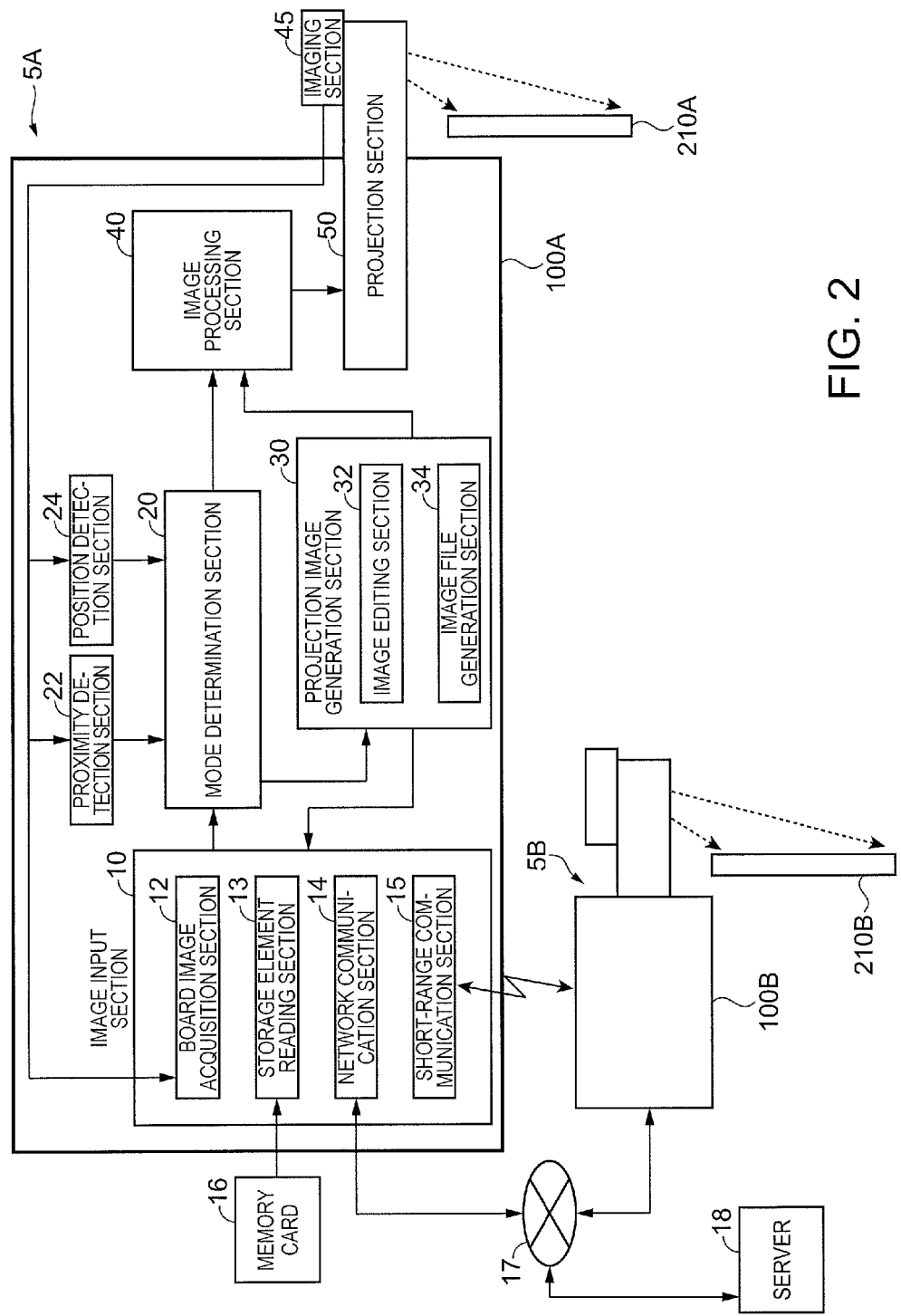
FIG. 2 is a block diagram showing a functional configuration of a projector according to the first embodiment of the invention.

FIG. 2 is a block diagram showing a functional configuration of the projector 100. In FIG. 2, the explanation will be presented citing two display systems 5A, 5B as an example. It should be noted that since the projectors 100A, 100B of the display systems 5A, 5B have the same configuration, the projector 100A of the display system 5A will hereinafter be explained as a representative.

The projector 100A is provided with an image input section 10, a mode determination section 20, a proximity detection section 22, a position detection section 24, a projection image generation section 30, an image processing section 40, an imaging section 45, and a projection section 50. It should be noted that the mode determination section 20, the projection image generation section 30, and the image processing section 40 correspond to a control section.

Image data to be projected by the projection section 50 is input to the image input section 10 in a predetermined file format. The image input section 10 is provided with a board image acquisition section 12, a storage element reading section 13, a network communication section 14, and a short-range communication section 15.

The board image acquisition section 12 obtains image data shot by the imaging section 45. It should be noted that a digital camera is assumed as the imaging section 45, and there is adopted a configuration in which the imaging section 45 shoots a projection image P projected on the projection plate 210A and a content written on the projection plate 210A by the user with a pen, and then the image data is obtained by the board image acquisition section 12. It is also possible to adopt a configuration in which the digital camera is provided to the projector 100A as an interactive function, or a configuration in which the digital camera is separated from the projector 100A.

The storage element reading section 13 can read the image data stored in a memory card 16 or the like.

As the network communication section 14, there is assumed, for example, communication with a wireless LAN, and the network communication section 14 is connected to a network 17 via a predetermined access point, and is capable of exchanging information with a server 18 connected to the network 17.

As the short-range communication section 15, there is assumed communication using Bluetooth (registered trademark) or WiFi Direct (registered trademark). In Bluetooth or Wifi Direct, short-range wireless communication is performed using a radio wave in a high-frequency range as a carrier. Further, in the case of performing the communication with Bluetooth or WiFi direct, the access point is unnecessary. Therefore, by connecting to one or a plurality of display systems 5 by directly pairing therewith, a variety of data can be transmitted and received with the connection destination. It should be noted that the carrier is not limited to the radio wave, but optical communication using an infrared ray as the carrier can also be assumed. In the first embodiment, transmission of status information and image file is performed between the display systems 5 using the communication via the short-range communication section 15.

The proximity detection section 22 detects the proximity in the case in which another display systems 5, for example, the display system 5B, moves toward the display system 5A. In the first embodiment, the proximity detection section 22 is configured so as to be able to detect contact between end portions of the projection plates 210 in addition to the proximity of the other display system 5. It should be noted that there is assumed the configuration of the proximity detected by the proximity detection section 22, in which the projection surfaces of the respective projection plates 210 are on the same side, and the display systems 5 are moved by the user pushing the display system 5.

Further, there is assumed a configuration of the contact between the display systems 5, in which, for example, the right end portion of the projection plate 210A and the left end portion of the projection plate 210B have actual contact with each other, or a configuration in which the right end portion of the projection plate 210A and the left end portion of the projection plate 210B come closer to each other within a predetermined distance. It should be noted that although in the first embodiment, there is assumed the proximity detection by the imaging section 45, the invention is not limited to this example, but the proximity can be detected by a distance sensor, a proximity sensor, and so on using a near infrared laser. In the case in which the proximity detection section 22 detects the proximity, the proximity detection section 22 transmits proximity information to the mode determination section 20.

The position detection section 24 detects the positional relationship with the adjacent display system 5B close thereto or having contact therewith. In the first embodiment, assuming the position detection by the imaging section 45, for example, there is detected the position information representing in which one of the left direction and the right direction the display system 5B is disposed toward the projection plate 210A of the display system 5A, and the position information thus detected is transmitted to the mode determination section 20. It should be noted that the position information is shared with the adjacent display system 5B, and is referred to in the case of determining the master-slave relationship described later.

It should be noted that as an identification method of the adjacent display system 5, for example, it is possible to attach a QR code (registered trademark), in which the information with which the display system 5 can be identified is described, at a position of the display system 5 which can be imaged by the imaging section 45, and read the QR code to thereby identify the display system 5. Further, the position detection is not limited to one using the imaging section 45, but there can also be assumed the position detection and identification adopting direction detection due to transmission and reception of a radio wave having a strong directive property or a method using the emission detection of a specific light signal.

The mode determination section 20 determines the master-slave relationship between the display system 5A and the display system 5B based on the proximity information transmitted from the proximity detection section 22 and the position information transmitted from the position detection section 24. In the present embodiment, one of the modes representing the master-slave relationship is a master, and the other thereof is a slave, and the display system 5 makes a transition to either one of the modes.

In the determination method of the master-slave relationship, it is also possible to set the display system 5 located on one of the right and left sides (the left side or the right side) when facing the projector plate 210 to the master among the two display systems 5A, 5B adjacent to each other within a predetermined distance, and to set one located on the other side (the right side or the left side) to the slave. Further, it is also possible to inherit the relationship of the master and the slave set in Bluetooth, or to set the group owner set in WiFi Direct to the master, and the other to the slave. Further, it is also possible to set one of the two display systems 5A, 5B, which moves to approach the other, to the slave, and to set the other to the master. Further, it is also possible to assume a configuration in which the user designates the master or the slave.

It should be noted that there is adopted a configuration in which the master-slave relationship of the modes thus set is reset in the case in which another display system 5 has further contact thereto or the case in which reconfiguration of the master-slave relationship is required.

Further, the mode determination section 20 holds the image data input to the image input section 10, and determines the destination of the image data in accordance with the master-slave relationship and the modes.

Firstly, in the case in which the system itself is the master, the system performs the following process as the master mode.

1. In the case in which the proximity detection section 22 does not detect the proximity of other display systems 5, the image data held is transmitted to the image processing section 40 without editing the image data so as to directly project the image data input to the image input section 10.

2. In the case in which the proximity detection section 22 has detected the proximity of the display system 5B, the position detection section 24 figures out the positional relationship between the system itself and the display system 5B, and in the case in which the proximity detection section 22 has further detected the contact with the display system 5B, the image data presently displayed is transmitted to the projection image generation section 30, and at the same time, cooperation display information representing the specification of performing the display with a plurality of systems including the display system 5B in cooperation with each other is transmitted to the projection image generation section 30.

It should be noted that the image data to be transmitted to the projection image generation section 30 is not limited to the image presently displayed by the system itself as the master. Specifically, there can also be assumed a configuration in which the mode determination section 20 determines either one of the image displayed in the master and the image displayed in the slave, then obtains the image data thus determined, and then transmits the image data to the projection image generation section 30. Further, there can also be assumed a configuration in which if neither the master nor the slave displays an image, the image designated by the user is taken as an object.

The cooperation display information represents, for example, the mode information representing that the image having been enlarged and divided is displayed by a plurality of display systems 5 in cooperation with each other (hereinafter referred to as an enlarged display mode), a division number, and the positional relationship between the plurality of display systems 5. It should be noted that the number of the display systems 5 having contact with the system itself is not limited to one, but there can also be assumed a case in which the number is equal to or larger than two.

Subsequently, in the case in which the system itself is the slave, the image data held in the system is transmitted to the image processing section 40 without being processed so as to directly project the image data input to the image input section 10 as the slave mode.

The projection image generation section 30 is provided with an image editing section 32 and an image file generation section 34.

The image editing section 32 edits the image data based on the cooperation display information. For example, in the case of dividing the image data into two in the enlarged display mode, the image editing section 32 edits the image data so that the image picture represented by the image data is displayed in an enlarged manner straddling the two projection plates 210A, 210B, and then transmits the image data thus edited to the image file generation section 34. It should be noted that the enlargement factor in the case of enlarging the image is appropriately determined so that the image picture can be displayed on the two projection plates 210A, 210B without lacking the image picture. It should be noted that the enlargement factor can also be set by the user operating the operation section 230.

The image file generation section 34 respectively generates the image data having a predetermined file format such as a PDF format based on the image data thus edited. The projection image generation section 30 transmits the image data, which is to be projected by the system itself, among the two image data thus generated to the image processing section 40, and transmits the image data, which is to be projected by the display system 5B, to the projector 100B of the display system 5B via the communication using the short-range communication section 15.

It should be noted that in the first embodiment, the transmission of the image data from the display system 5A to the display system 5B is not only performed by the short-range communication section 15, but it is also possible to assume a configuration in which the transmission is performed via the network communication section 14.

The image processing section 40 performs image processing on the image data transmitted from the mode determination section 20 or the projection image generation section 30, then generates an image signal which can be projected by the projection section 50, and then transmits the image signal to the projection section 50.

In the first embodiment, the image processing section 40 performs a resizing process based on the image data input, and at the same time, generates the image signal expressing each of the grayscales of R (red), G (green), and B (blue) in a predetermined length, and a luminance signal. Further, the image processing section 40 calculates a feature amount based on the luminance signal, an expansion process is performed on the image signal based on an expansion coefficient calculated from the feature amount thus calculated, and then the image signal on which the expansion process has been performed is transmitted respectively to liquid crystal devices 85R, 85G, and 85B (FIG. 3) of the projection section 50.

Figure 3:
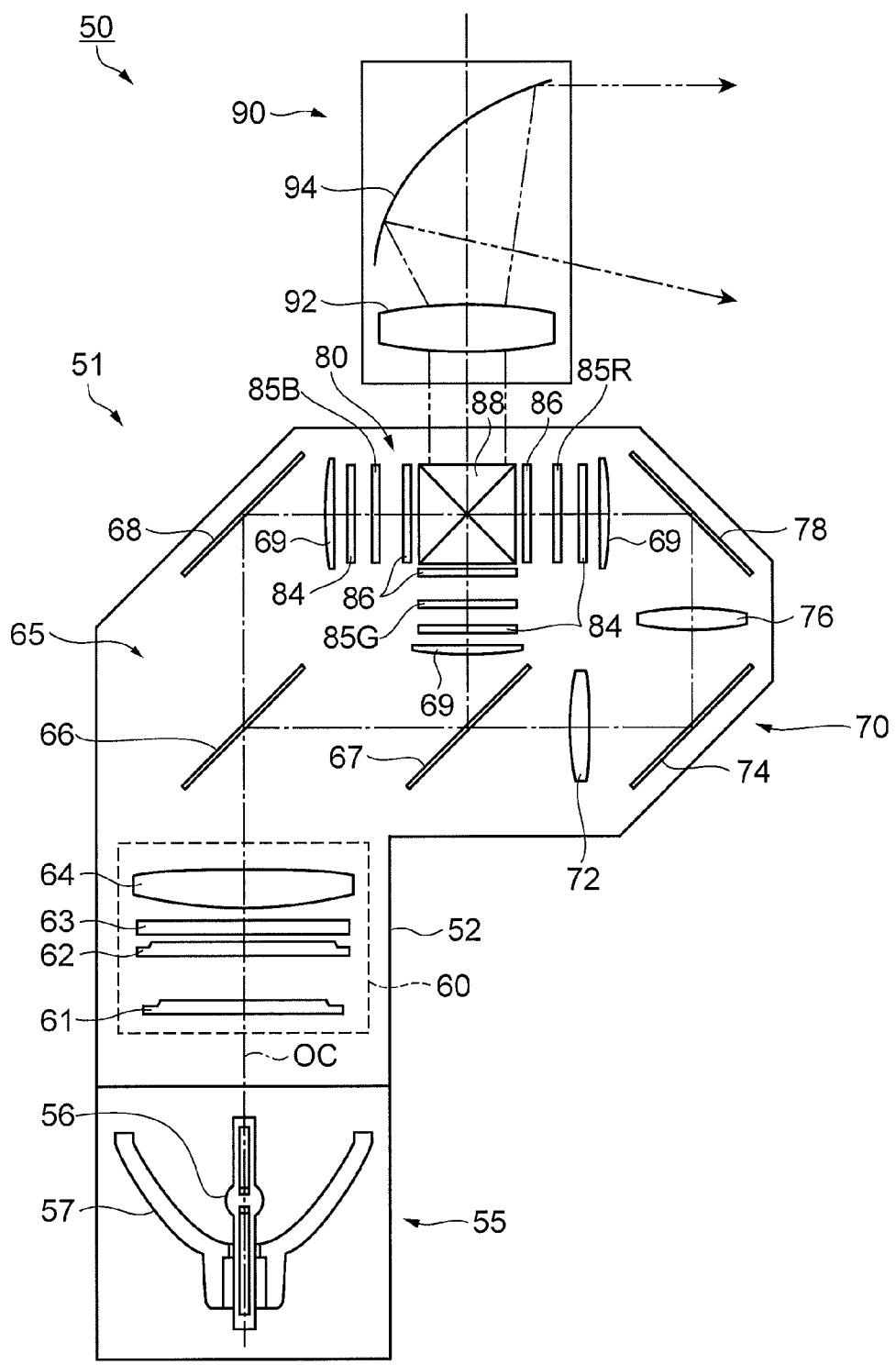
FIG. 3 is a diagram schematically showing an optical system of a projection section in the first embodiment of the invention.

FIG. 3 is a diagram schematically showing an optical system of the projection section 50, and a general configuration of the optical system will be explained with reference to FIG. 3.

The optical system of the projection section 50 is configured in an optical unit 51. The optical unit 51 is provided with an optical component housing 52, a light source device 55, an illumination optical device 60, a color separation optical device 65, a relay optical device 70, a light modulation device 80, and a projection optical device 90. The optical components constituting each of these devices are housed in the optical component housing 52.

The light source device 55 is provided with a light emitting tube 56 for emitting a light beam and a reflector 57. The light source device 55 reflects the light beam emitted from the light emitting tube 56 with the reflector 57 to align the emission direction, and then emits the light beam toward the illumination optical device 60. It should be noted that an illumination light axis OC corresponds to the center axis of the light beam emitted from the light source device 55 toward an illuminated area.

The illumination optical device 60 is provided with lens arrays 61, 62, a polarization conversion element 63, an overlapping lens 64, and a field lens 69, and has a function of homogenizing the illuminance in a plane perpendicular to the illumination light axis OC with respect to the light beam emitted from the light source device 55.

The color separation optical device 65 is provided with dichroic mirrors 66, 67 and a reflecting mirror 68, and separates the light beam emitted from the illumination optical device 60 into three colored light beams of red (R) light beam, green (G) light beam, and blue (B) light beam, and then guides the three colored light beams to three liquid crystal devices 85R, 85G, and 85B, respectively.

The relay optical device 70 is provided with an entrance side lens 72, relay lenses 76, reflecting mirrors 74, 78. The relay optical device 70 guides the colored light beam (the R light beam in the present embodiment) separated by the color separation optical device 65 to the liquid crystal device 85 (the liquid crystal device 85R in the present embodiment) while preventing the degradation of the light efficiency due to the diffusion of the light caused by the fact that the length of the light path of the colored light beam separated by the color separation optical device 65 becomes longer than the lengths of the light paths of other light beams.

The light modulation device 80 is provided with three entrance side polarization plates 84, the three liquid crystal devices 85R, 85G, and 85B, three exit side polarization plates 86, and a cross dichroic prism 88. The liquid crystal devices 85R, 85G, and 85B modulate the respective colored light beams separated by the color separation optical device 65 in accordance with the image signal. The cross dichroic prism 88 combines the colored light beams respectively modulated by the liquid crystal devices 85R, 85G, and 85B, and then emits the result toward the projection optical device 90.

The projection optical device 90 is provided with an ultra short focus projection lens 92 and a reflecting mirror 94 having a curved surface, and by enlarging the light beams modulated by the light modulation device 80 and then combined using the projection lens 92, and then reflecting the light beams with the reflecting mirror 94 to project the light beams on the projection plate 210 of the white board 200 in an enlarged manner, the projection image P based on the image signal is displayed on the projection plate 210.

Figure 4:
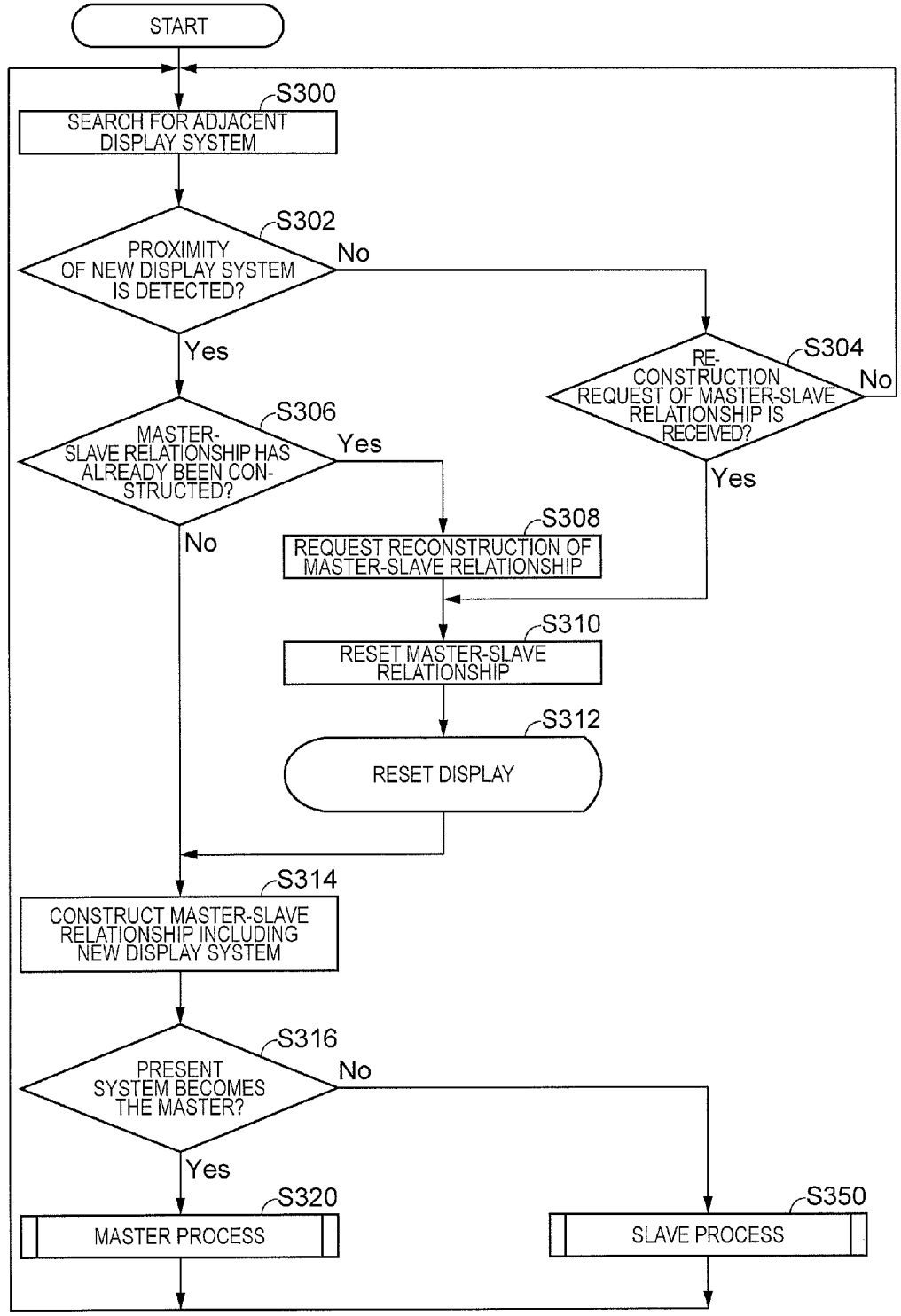
FIG. 4 is a flowchart showing a flow of a process of the display system according to the first embodiment of the invention.

FIG. 4 is a flowchart showing the flow of the process of the display system 5A. When the process is started, the display system 5A starts (step S300) searching for the adjacent display system 5 <proximity detection step>.

As a result of searching, if the display system 5A detects the proximity of a new display system 5B (Yes in the step S302), whether or not the master-slave relationship is constructed with the display system 5B is determined (step S306), and if it is determined that the master-slave relationship is not constructed with the display system 5B (No in the step S306), the process proceeds to the step S314.

Here, going back to the step S302, in the case in which the display system 5A fails to detect the proximity of the new display system 5B (No in the step S302), the display system 5A determines (step S304) whether or not the reconstruction request of the master-slave relationship has been received. As a result, if it has been determined that the reconstruction request of the master-slave relationship has not been received (No in the step S304), the process returns to the step S300. On the other hand, if it has been determined that the reconstruction request of the master-slave relationship has been received (Yes in the step S304), the process proceeds to the step S310.

Further, if it has been determined in the step S306 that the master-slave relationship is constructed with the display system 5B (Yes in the step S306), the display system 5A requests (step S308) the display system 5B to reconstruct the master-slave relationship, and then the process proceeds to the step S310.

The display system 5A resets the master-slave relationship in the step S310, and then resets (step S312) the projection image P to be displayed by the projector 100A, and the process proceeds to the step S314.

In the step S314, the display system 5A constructs the master-slave relationship including the new display system 5B.

As a result of constructing the master-slave relationship, if the display system 5A becomes the master (Yes in the step S316), the display system 5A performs (step S320) the master process, and then the process returns to the step S300, and the series of processes are repeated.

On the other hand, if the display system 5A becomes the slave (No in the step S316), the display system 5A performs (step S350) the slave process, and then the process returns to the step S300, and the series of processes are repeated.

It should be noted that the series of processes are continued until the user powers down the display system 5A, or the termination is instructed.

Figure 5:
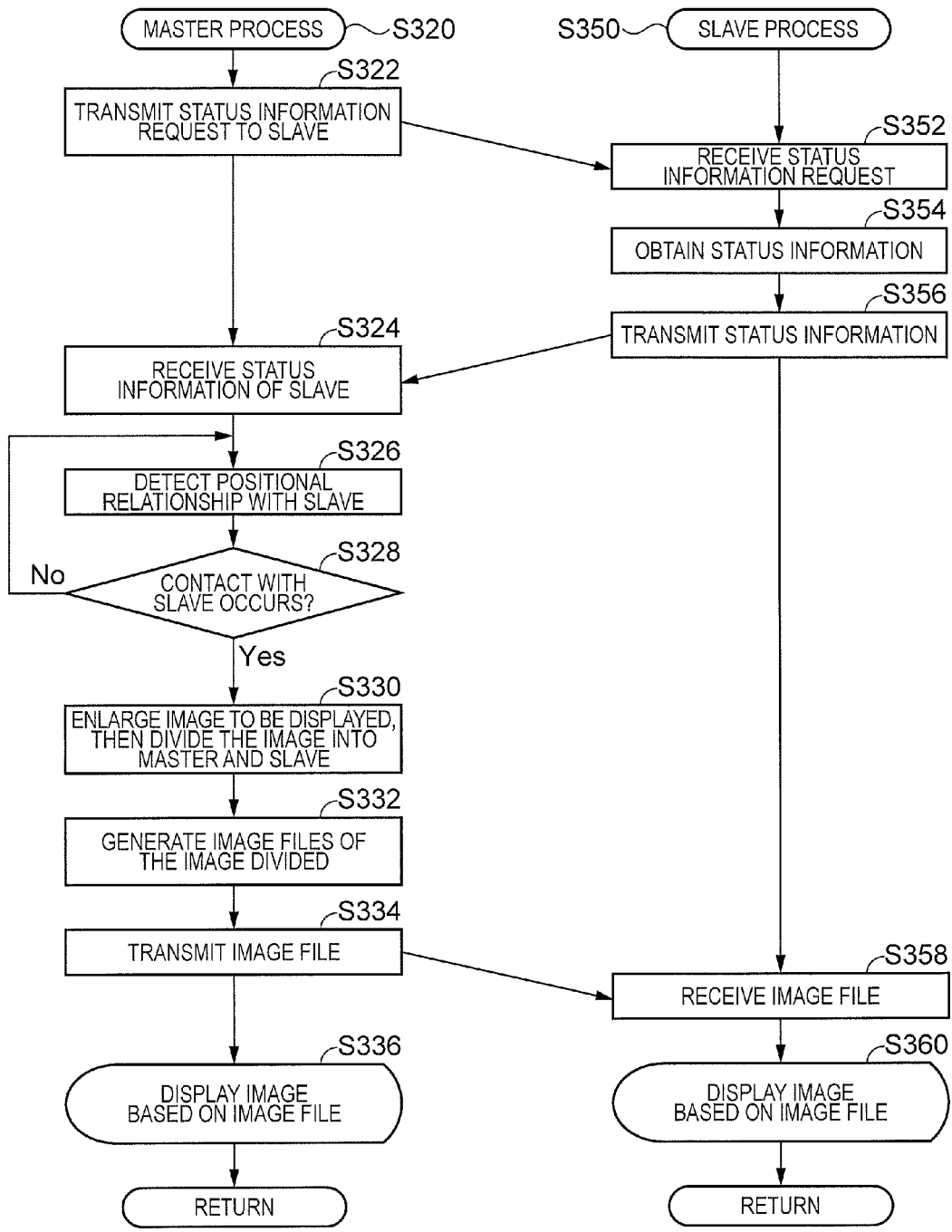
FIG. 5 is a flowchart for explaining a flow of a master process and a slave process when a division display mode is instructed in the first embodiment of the invention.

FIG. 5 is a flowchart for explaining the flow of the master process (step S320) and the slave process (step S350) when the enlarged display mode is instructed, and the explanation will be presented with reference also to FIGS. 6A through 6D showing the positional relationship between the display systems 5. It should be noted that in order to make the understanding of the processes easier, the explanation will be presented assuming that the display system 5A is the master, and the display system 5B and the display system 5C are the slaves.

Figure 6A:
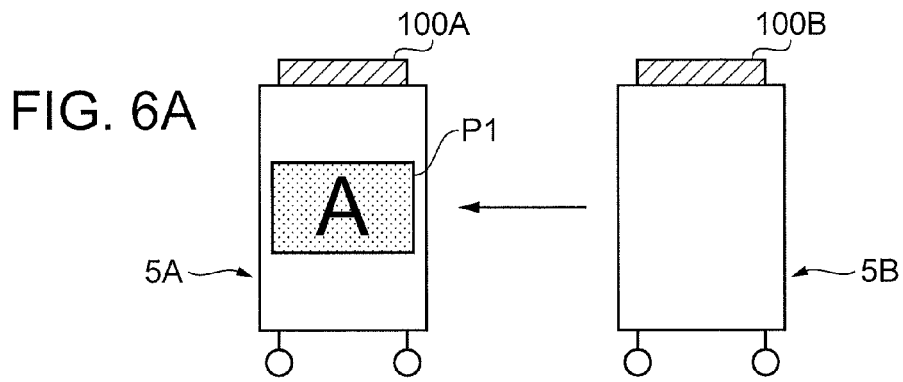
FIGS. 6A through 6D are diagrams showing a positional relationship between the display systems in the first embodiment of the invention.

Firstly, the display system 5A transmits (step S322) a status information request to the display system 5B in a proximity state. It should be noted that as shown in FIG. 6A, the display system 5A is in a state of displaying the projection image P1, and the display system 5B is in a state being powered on, but not displaying a projection image.

Then, the display system 5B receives (step S352) the status information request, then obtains (step S354) the status information related to a state, an attribute, and so on of the display system 5B itself, and then transmits (step S356) the status information to the display system 5A.

Then, the display system 5A receives (step S324) the status information of the display system 5B, and obtains the information related to the display system 5B in the proximity state.

Then, the display system 5A detects (step S326) the positional relationship with the display system 5B to thereby detect whether the display system approaches the projection image P1 from the right side or from the left side. It should be noted that in the first embodiment, as shown in FIG. 6A, there is assumed the configuration in which the display system 5B approaches from the right side of the display system 5A.

Then, the display system 5A determines (step S328) whether or not the projection plate 210A and the projection plate 210B of the display system 5B have contact with each other, and if the contact is not detected (No in the step S328), the process returns to the step S326.

Figure 6B:
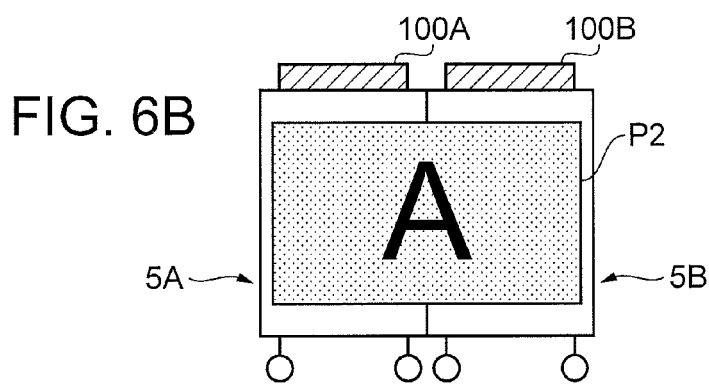

On the other hand, as shown in FIG. 6B, if the contact with one side (the left side) of the projection plate 210B of the display system 5B has been detected (Yes in the step S328), the display system 5A edits (step S330) the projection image P1 presently displayed to enlarge the image, and to divide the image so that the division display of the image is performed by the display system 5A and the display system 5B.

Then, the display system 5A generates (step S332) the image files based on the divided images, and then transmits (step S334) the image file of the image to be displayed on the display system 5B to the display system 5B.

Then, the display system 5A displays (step S336) the image based on the image file to be displayed by the display system 5A itself.

Further, the display system 5B receives (step S358) the image file thus transmitted, and then displays (step S360) the image based on the image file thus received.

Through the processes described hereinabove, in response to the projection plates 210 having contact with each other, the display system 5A and the display system 5B start the division display by displaying the divided images on the respective projection plates 210 as shown in FIG. 6B to form the projection image P2 obtained by enlarging the projection image P1, and the series of processes are terminated.

It should be noted that in the first embodiment, there is assumed the configuration in which the projection range in the horizontal direction of the projection plate 210 in the case in which the display system 5A displays the projection image P1 shown in FIG. 6A and the projection range in the horizontal direction of the projection plate 210 in the case in which the display system 5A displays the division of the projection image P2 shown in FIG. 6B are different from each other.

In this case, in the display system 5A, the blank area on the side (the right side) of the projection plate 210A on which the projection plate 210A has contact when performing the division display becomes narrower, and similarly, in the display system 5B, the blank area on the side (the left side) of the projection plate 210B on which the projection plate 210B has contact when performing the division display also becomes narrower. In other words, when performing the division display, the projection ranges are expanded in the horizontal direction. As a result, the joint between the projection plates 210A, 210B becomes continuous, and the visibility of the projection image P2 is improved.

Figure 6C:
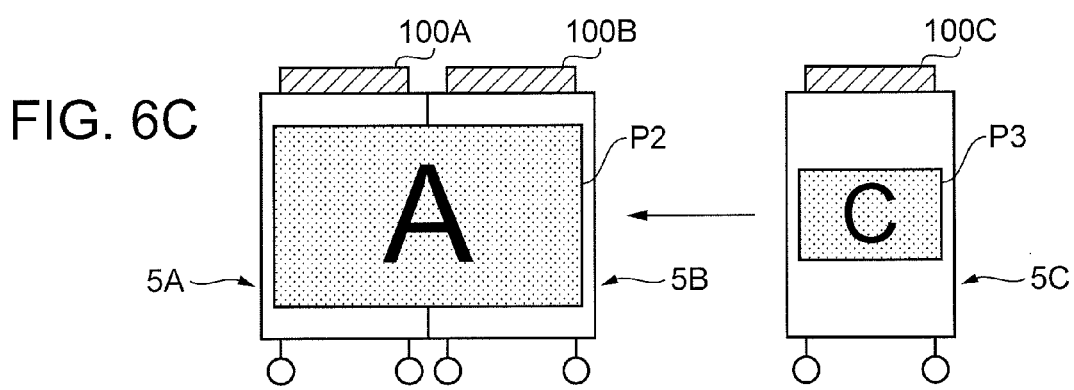

Further, in the case in which the display system 5A and the display system 5B perform the division display, there can be assumed the configuration in which a display system 5C approaches from the other side (the right side) of the display system 5B as shown in FIG. 6C.

In such a case, the master-slave relationship between the display system 5A and the display system 5B is reset, and then the master-slave relationship between the display system 5A, the display system 5B, and the display system 5C is reconstructed. Then, as shown in FIG. 6D, in the case in which the display system 5B already having contact with the display system 5A further has contact with the display system 5C, the image files are respectively generated so as to perform the division display by the three display systems, and a projection image P4 obtained by enlarging the projection image P1 is formed so as to straddle the three projection plates 210.

On this occasion, although the projection image P3 displayed on the display system 5C as the slave is deleted, the image data of the projection image P3 can also be stored in the display system 5C in a recoverable manner in the case in which the projection image P3 includes an insertion with a pen or the like.

Figure 6D:
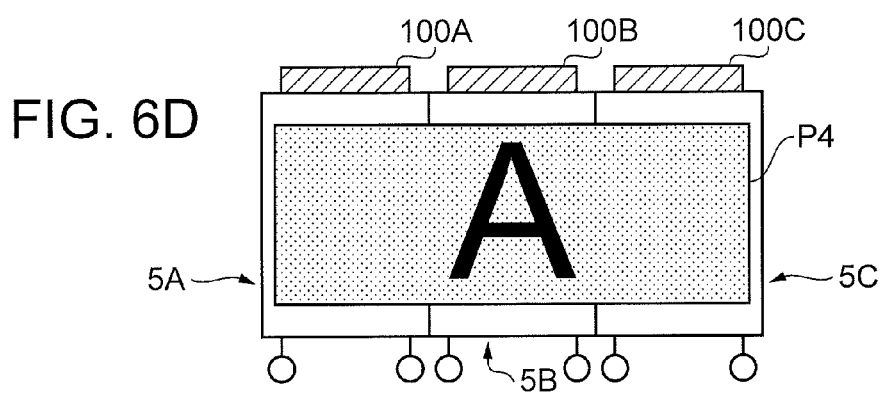

It should be noted that although the case in which the display system 5A becomes the master is cited as an example in FIG. 6D, if the display system 5C becomes the master, the projection image P3 becomes the object of the enlarged display instead of the projection image P1.

Further, in the first embodiment, in the case in which the display systems 5 having contact with each other are separated beyond a predetermined distance, the master-slave relationship is reset to cancel the enlarged display mode, and the division display is terminated. The display systems 5 restore the respective display configurations taken before the contact.

According to the embodiment described hereinabove, the following advantages can be obtained.

1. By arranging the plurality of display systems 5 so that the projection plates 210 have contact with each other and are continuous with each other, the plurality of display systems 5 cooperate with each other to make it possible to display a single image on the plurality of projection plates 210 in an enlarged manner, and therefore, the enlarged display of the image can easily be realized.

2. In the case in which a plurality of display systems 5 performs the display in cooperation with each other, by further adding the display system 5, further enlargement of the image can easily be realized. Further, by moving the display system 5 located at the end of the plurality of display systems 5 cooperating with each other in a direction of getting away therefrom, the image to be displayed can easily be contracted.

Second Embodiment

Then, a second embodiment of the invention will be explained with reference to FIGS. 7 and 8A through 8C. It should be noted that in the following explanation, functional parts and processes the same as the parts having already been explained are denoted with the same reference symbols, and the explanation thereof will be omitted. Although in the first embodiment, the enlarged display mode for displaying an enlarged image with a plurality of display systems 5 in cooperation with each other is assumed as the cooperation display information, a copy display mode for copying the image displayed by the master to the slave to display the copy is assumed in the second embodiment.

It should be noted that there is assumed the configuration in which the mode determination section 20 functions as a selection section for selecting either one of the enlarged display mode and the copy display mode, and the user calls a selection screen not shown to make the selection via the operation section 230. Further, in the case in which the master and the slave respectively display the images before performing the copy process, it is also possible to display the selection screen to allow the user to select which one of the images is copied to the other.

Further, there can also be assumed the configuration in which the copy display mode is selected in the case in which an insertion with a pen or the like has been made to the projection plate 210A, and the enlarged display mode is selected in the case in which no insertion exists.

Further, the copy display mode is not limited to the configuration of keeping the image displayed by the master without modification and copying the image to the slave, but includes a configuration of deleting the image displayed by the master after copying the image to the slave, namely moving of the image. Further, there can also be assumed a configuration in which the image displayed in the slave when executing the copy display mode is continuously displayed, and the image of the master is overwritten thereon, namely image synthesizing.

Further, it is also possible that the image transmitted from the master and the image having been displayed in the slave are combined with each other in the slave, and the image thus combined is transmitted to and displayed by the master. It is also possible to display a selection menu on the projection plate 210 to allow the user to select such configurations via the operation section 230 of the display system 5.

In the second embodiment, in the case in which the copy display mode is instructed, the image editing section 32 obtains the image data of the content displayed on the projection plate 210A from the board image acquisition section 12, and then transmits the image data to the image file generation section 34.

Figure 7:
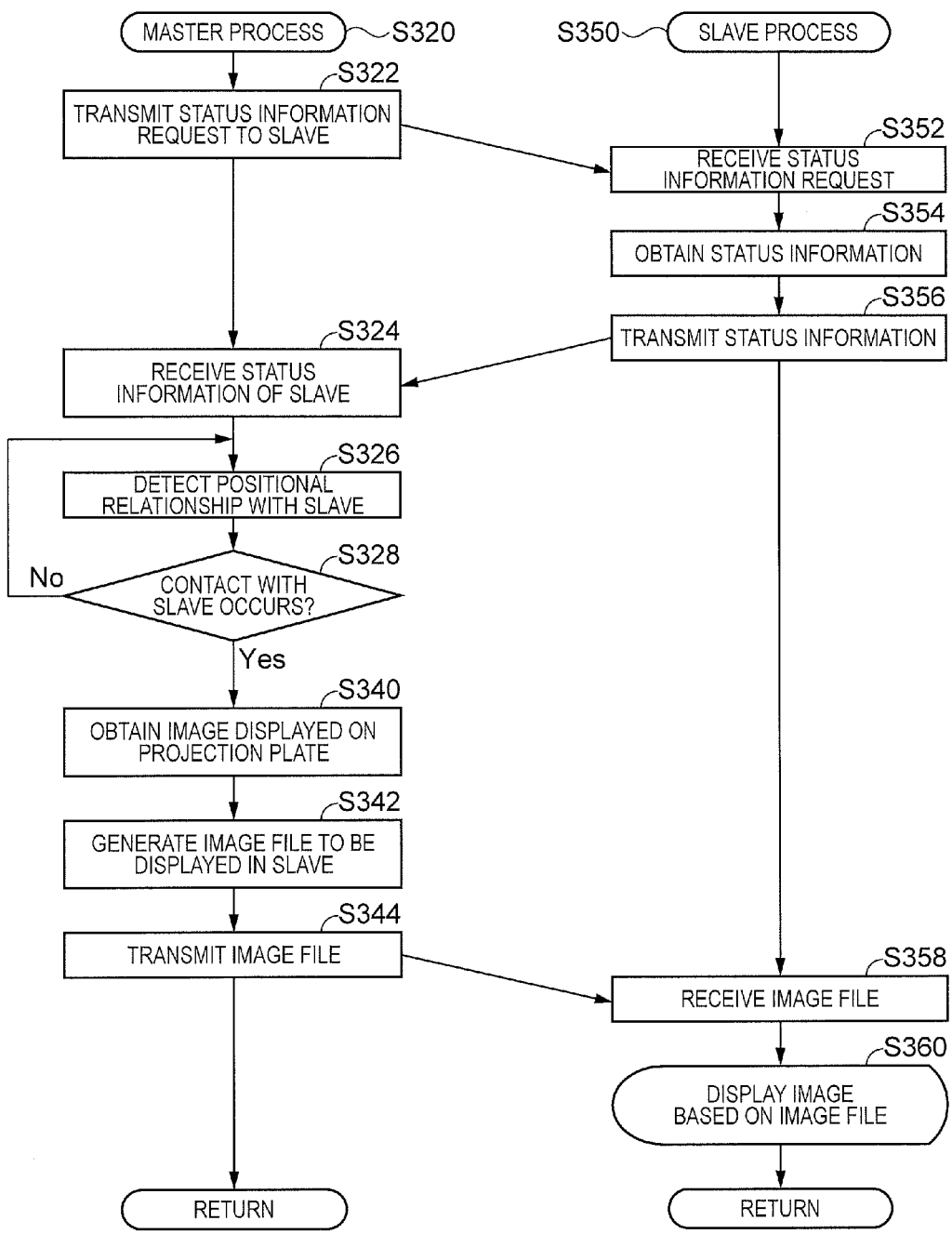
FIG. 7 is a flowchart for explaining a flow of a master process and a slave process when a copy display mode is instructed in a second embodiment of the invention.
Figure 8A:
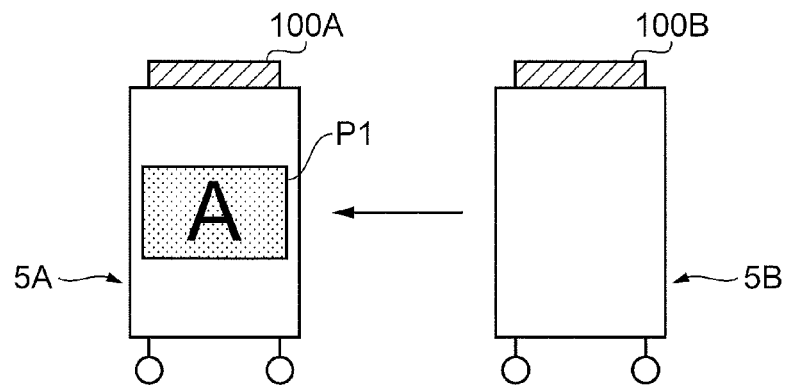
FIGS. 8A through 8C are diagrams showing a positional relationship between the display systems in the second embodiment of the invention.
Figure 8B:
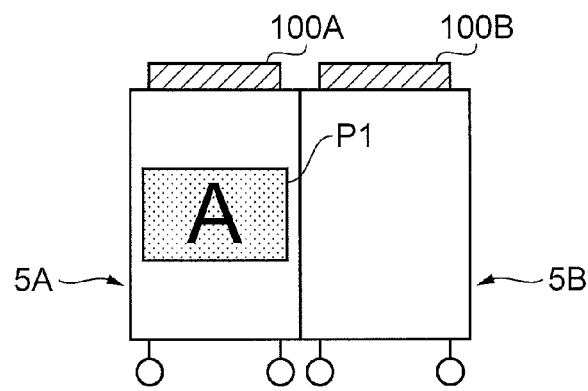
Figure 8C:
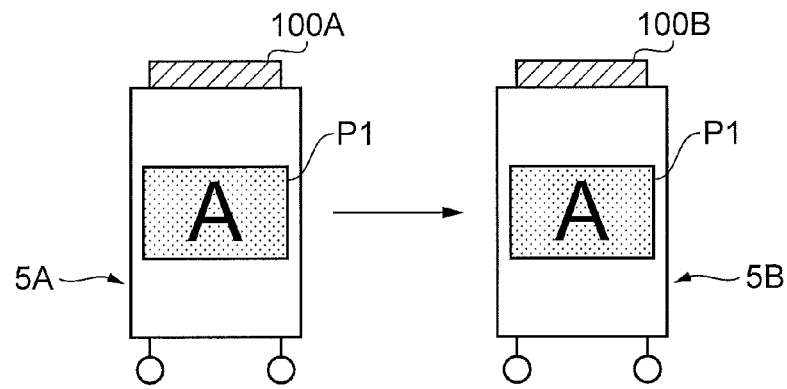

FIG. 7 is a flowchart for explaining the flow of the master process (step S320) and the slave process (step S350) when the copy display mode is instructed, and the explanation will be presented with reference also to FIGS. 8A through 8C showing the positional relationship between the display systems 5. It should be noted that in order to make the understanding of the processes easier, the explanation will be presented assuming that the display system 5A is the master, and the display system 5B is the slave.

In the step S340 shown in FIG. 7, the display systems 5A, 5B are in the state of having contact with each other as shown in FIG. 8B. In this state, the display system 5A obtains the image displayed on the projection plate 210A. Then, the display system 5A generates (step S342) the image file to be displayed in the display system 5B, and then transmits (step S344) the image file thus generated to the display system 5B.

The display system 5B receives (step S358) the image file thus transmitted, and then displays (step S360) the image based on the image file thus received.

Through the processes described hereinabove, the display system 5A continuously displays the projection image P1 having been displayed until the present process is executed, and the display system 5B displays the same projection image P1 as the projection image P1 of the display system 5A.

It should be noted that as shown in FIG. 8C, even in the case in which the display system 5B is released from the contact state with the display system 5A and gets away therefrom, the display system 5B continues to display the projection image P1, and in the case in which the user operates the operation section 230 of the display system 5B to instruct the termination of the display, the display system 5B terminates the display of the projection of the projection image P1.

According to the embodiment described hereinabove, the following advantage can be obtained.

1. By making the projection plates 210 of the plurality of display systems 5 have contact with each other, the image displayed in one display system 5A can easily be copied to and displayed by the rest of the plurality of display systems 5, and therefore, the copy display of an image can easily be realized.

Third Embodiment

Then, a third embodiment of the invention will be explained with reference to FIG. 9. Although in the first and second embodiments, there is assumed the configuration in which the selection of the enlarged display mode or the copy display mode is set by the user via the operation section 230 of the display system 5A, there is assumed in the third embodiment the configuration that the mode determination section 20 performs the selection in accordance with the movement of the display systems 5.

For example, in the case in which the plurality of display systems 5 has contact with each other, and then the contact state is released and the display systems 5 become separated from each other before the contact time exceeds a predetermined time, the mode determination section 20 selects the copy display mode. Further, in the case in which the contact state is kept even after a predetermined time elapses, the mode determination section 20 selects the enlarged display mode.

Figure 9:
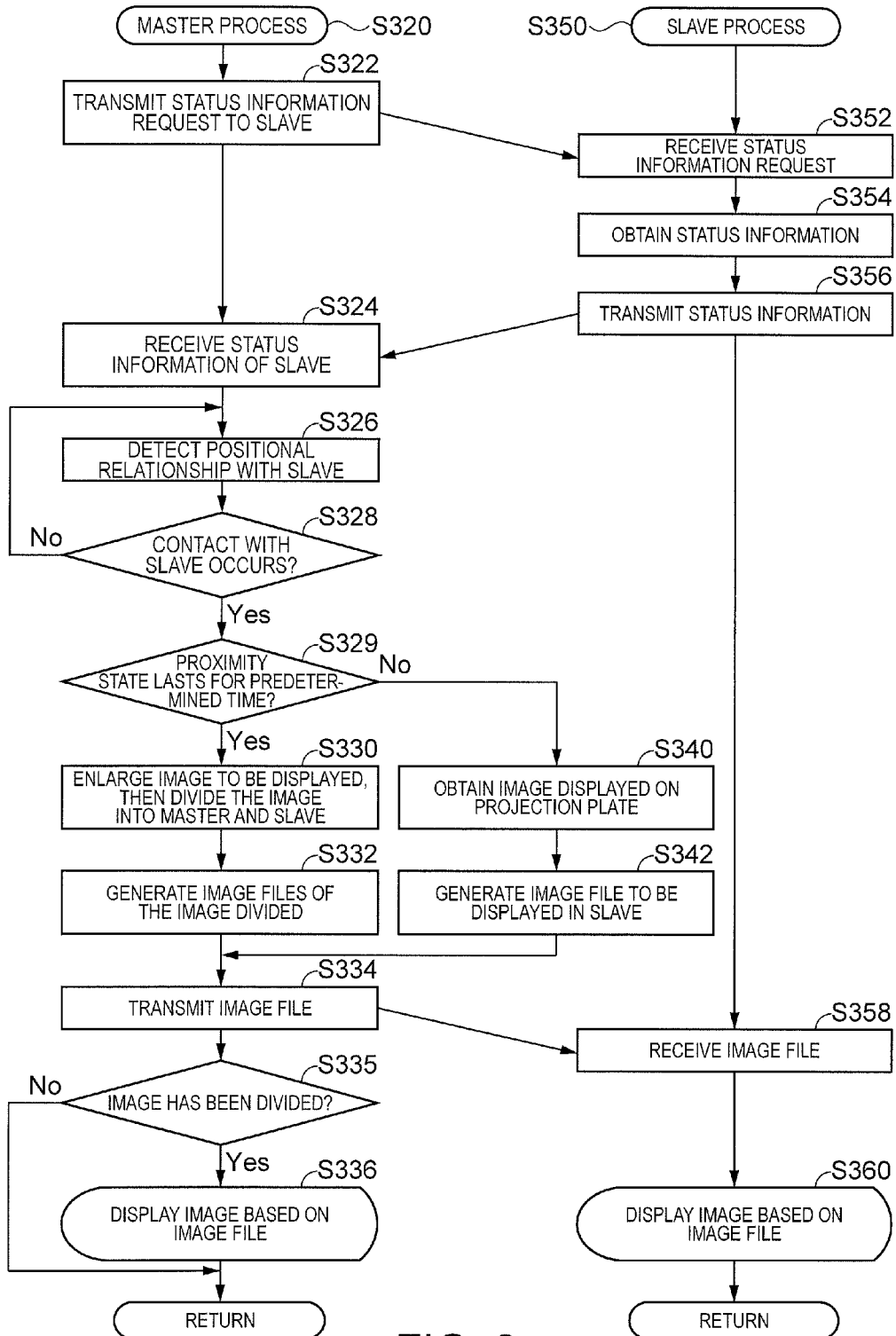
FIG. 9 is a flowchart for explaining a flow of a master process and a slave process in a third embodiment of the invention.

FIG. 9 is a flowchart for explaining the flow of a master process (step S320) and a slave process (step S350). It should be noted that in order to make the understanding of the processes easier, the explanation will be presented assuming that the display system 5A is the master, and the display system 5B is the slave.

In the step S329 shown in FIG. 9, the display system 5A determines whether the state in which the projection plate 210 of the display system 5A and the projection plate 210 of the display system 5B have contact with each other lasts for a predetermined period of time.

Here, in the case in which the contact state with the display system 5B lasts for the predetermined period of time (Yes in the step S329), the enlarged display mode is executed. Specifically, the display system 5A edits (step S330) the projection image P1 presently displayed to enlarge the image, and at the same time, divide the image so that the division display is performed by the display system 5A and the display system 5B <enlarged display step>.

Then, the display system 5A generates (step S332) the image file based on the image thus divided, and the process proceeds to the step S334.

On the other hand, in the case in which the contact state with the display system 5B fails to last for the predetermined period of time (No in the step S329), the copy display mode is executed. Specifically, the display system 5A obtains (step S340) the image displayed on the projection plate 210A. Then, the display system 5A generates (step S342) the image file to be displayed in the display system 5B, and the process proceeds to the step S334.

In the step S334, the display system 5A transmits (step S344) the image file thus generated to the display system 5B.

Then, the display system 5A determines (step S335) whether or not the enlarged display mode with the image divided has been executed, and in the case in which the copy display mode has been executed (No in the step S335), the display system 5A keeps the state of displaying the projection image P1.

On the other hand, if the enlarged display mode has been executed (Yes in the step S335), the display system 5A displays (step S336) the image based on the image file displayed by the display system 5A itself.

Further, the display system 5B receives (step S358) the image file thus transmitted, and then displays (step S360) the image based on the image file thus received.

According to the embodiment described hereinabove, the following advantage can be obtained.

1. It is possible for the display system 5A to enlarge the image presently displayed by the display system 5A and then make the plurality of projection plates 210 of the display system 5A and the display system 5B display the image in cooperation with each other, or to copy the same image as the image presently displayed by the display system 5A to the display system 5B to be displayed by the display system 5B in accordance with the contact or separation state with the display system 5B.

Although the first through third embodiments of the invention are described hereinabove with reference to the accompanying drawings, the specific configurations are not limited to the embodiments described above, but design changes within the scope or the spirit of the invention is also included therein. For example, in the case of selecting either of the enlarged display mode and the copy display mode, it is also possible to shoot the action (gesture) of the fingers or the body of the user using the imaging section 45, and then make the selection based on the action of the user thus shot instead of the configuration in which the user makes the selection via the operation section 230.

Further, the invention is not limited to the configuration in which the display system 5A having become the master generates the image files corresponding to the images to be displayed by the master and the slave. For example, there can also be assumed a configuration in which the server 18 for providing a cloud service generates the image files to be displayed by the respective display systems 5, and then transmits the image files to the respective network communication sections 14.

Further, there can also be assumed a configuration in which the master does not generate the image files corresponding to the images to be displayed by the master and the slave in a divided manner, but transmits the image file before being divided and area information of the projection in each of the slaves to each of the slaves, and each of the slaves calculates the area where the display is performed based on the area information, and then performs the display.

Further, although in the embodiments described above, the three-panel projector using three liquid crystal light valves is explained, the invention is not limited to this configuration. The invention can also be applied to, for example, a single-panel projector capable of modulating the R light beam, the G light beam, and the B light beam with a single liquid crystal light valve.

Further, although in the embodiments described above, the transmissive liquid crystal light valves are used as the light modulation device 80, it is also possible to use a reflective light modulation device such as reflective liquid crystal light valves. Further, it is also possible to use a micromirror array device or the like for modulating the light emitted from the light source by controlling the emission direction of the incident light micromirror by micromirror.

Further, although in the embodiments described above, the light source is configured including the discharge light source lamp, there can also be used a sold-state light source such as a light emitting diode (LED) or a laser diode, and other light sources.

Further, the device for achieving the system described above can be realized by a single device in some cases, or can also be realized by combining a plurality of devices, and therefore, a variety of configurations are included.

Each of the constituents and the combinations of the constituents in the embodiments are illustrative only, and modifications such as addition, omission, or substitution of a constituent can be provided within the scope or the spirit of the invention. Further, the invention is not limited by the embodiments, but is only limited by the appended claims.

What is claimed is:

1. A display system having a projection device and a projection target member, and adapted to project an image from the projection device toward the projection target member to thereby display the image, the display system comprising:
    a proximity detection section adapted to detect a proximity of another display system, which has a projection device and a projection target member, and is adapted to project its image from the projection device toward its projection target member to thereby display its image; and
    a control section adapted to;
    determine a projection image;
    enlarge the determined projection image;
    display the enlarged projection image so as to straddle the projection target member and the projection target member of the other display system in a case in which the proximity detection section detects the proximity of the other display system;
    make the projection target member and the projection target member of the other display system start division display of the projection image in a case in which the projection target member and the projection target member of the other display system have contact with each other; and
    make the division display be terminated in a case in which the projection target member and the projection target member of the other display system once having contact with each other are separated from each other.

2. The display system according to claim 1, wherein the control section determines either of the image projected by the projection device and the image projected by the projection device of the other display system as the projection image in the case in which the proximity detection section detects the proximity of the other display system.

3. The display system according to claim 1, further comprising:
    a position detection section adapted to detect a positional relationship with the other display system in a proximity state,
    wherein the control section generates a plurality of divided images used to project the projection image toward the projection target member and the projection target member of the other display system in a divided manner based on the positional relationship detected by the position detection section.

4. The display system according to claim 3, further comprising:
    a communication section adapted to transmit divided image generated by the control section to the other display system via wireless communication.

5. The display system according to claim 4, wherein the control section executes one of
    a process in a master mode of generating the divided images from the projection image, making the projection device project one of the divided images generated, and transmitting another of the divided images from the communication section to the other display system, and
    a process in a slave mode of receiving divided image transmitted from other display system, and making the projection device project the divided image received.

6. The display system according to claim 1, wherein the control section expands a projection range in the projection target member in a case in which the proximity detection section detects the proximity of the other display system.

7. A display system having a projection device and a projection target member, and adapted to project an image from the projection device toward the projection target member to thereby display the image, the display system comprising:
    a proximity detection section adapted to detect a proximity of another display system, which has a projection device and a projection target member, and is adapted to project its image from the projection device toward its projection target member to thereby display its image;
    a selection section adapted to select one of
    an enlarged display mode of determining a projection image, enlarging the determined projection image, and displaying the enlarged projection image so as to straddle the projection target member and the projection target member of the other display system, and
    a copy display mode of displaying the image displayed on either one of the projection target member and the projection target member of the other display system on the other of the projection target member and the projection target member of the other display system in a case in which the proximity detection section detects the proximity of the other display system; and
    a control section adapted to control displaying in accordance with mode selected by the selection section.

8. The display system according to claim 7, wherein the selection section selects the enlarged display mode in a case in which a contact time between the projection target member and the projection target member of the other display system exceeds a predetermined time, and selects the copy display mode in a case in which the contact time between the projection target member and the projection target member of the other display system fails to exceed the predetermined time.

9. A method of controlling a display system having a projection device and a projection target member, and adapted to project an image from the projection device toward the projection target member to thereby display the image, the method comprising:
    detecting a proximity of another display system, which has a projection device and a projection target member, and is adapted to project its image from the projection device toward its projection target member to thereby display its image;
    determining a projection image, enlarging the determined projection image, and displaying the enlarged projection image so as to straddle the projection target member and the projection target member of the other display system in a case in which the proximity of the other display system is detected in the detecting of proximity; and making the projection target member and the projection target member of the other display system start division display of the projection image in a case in which the projection target member and the projection target member of the other display system have contact with each other, and making the division display be terminated in a case in which the projection target member and the projection target member of the other display system once having contact with each other are separated from each other.

10. A display system having a projection device and a projection target member, and adapted to project an image from the projection device toward the projection target member to thereby display the image, the display system comprising:
- a proximity detection section adapted to detect a proximity of another display system, which has a projection device and a projection target member, and is adapted to project its image from the projection device toward its projection target member to thereby display its image;
- a position detection section adapted to detect a positional relationship with the other display system in a proximity state;
- a control section adapted to:
  - determine a projection image;
  - enlarge the determined projection image;
  - display the enlarged projection image so as to straddle the projection target member and the projection target member of the other display system in a case in which the proximity detection section detects the proximity of the other display system; and
  - generate a plurality of divided images used to project the projection image toward the projection target member and the projection target member of the other display system in a divided manner based on the positional relationship detected by the position detection section; and
- a communication section adapted to transmit a divided image generated by the control section to the other display system via wireless communication, wherein the control section executes one of
- a process in a master mode of generating the divided images from the projection image, making the projection device project one of the divided images generated, and transmitting another of the divided images from the communication section to the other display system, and
- a process in a slave mode of receiving a divided image transmitted from the other display system, and making the projection device project the divided image received.

11. A display system having a projection device and a projection target member, and adapted to project an image from the projection device toward the projection target member to thereby display the image, the display system comprising:
- a proximity detection section adapted to detect a proximity of another display system, which has a projection device and a projection target member, and is adapted to project its image from the projection device toward its projection target member to thereby display its image; and
- a control section adapted to:
  - determine a projection image,
  - enlarge the determined projection image;
  - display the enlarged projection image so as to straddle the projection target member and the projection target member of the other display system in a case in which the proximity detection section detects the proximity of the other display system; and
  - expand a projection range in the projection target member in a case in which the proximity detection section detects the proximity of the other display system.

* * * * *